(12) United States Patent
Herzog et al.

(10) Patent No.: US 12,222,834 B2
(45) Date of Patent: Feb. 11, 2025

(54) DISCOVERY TROUBLESHOOTING BASED ON MACHINE LEARNING

(71) Applicant: ServiceNow, Inc., Santa Clara, CA (US)

(72) Inventors: Shay Herzog, Petah Tikva (IL); Asaf Garty, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/323,072

(22) Filed: May 24, 2023

(65) Prior Publication Data

US 2024/0394165 A1 Nov. 28, 2024

(51) Int. Cl.
*G06F 11/30* (2006.01)
*H04L 41/069* (2022.01)
*H04L 41/16* (2022.01)

(52) U.S. Cl.
CPC ...... *G06F 11/3051* (2013.01); *G06F 11/3006* (2013.01); *H04L 41/069* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 4,941,084 A | 7/1990 | Terada | |
| 5,185,860 A | 2/1993 | Wu | |
| 5,237,518 A | 8/1993 | Sztipanovits | |
| 5,261,097 A | 11/1993 | Saxon | |
| 5,265,252 A | 11/1993 | Rawson, III | |
| 5,367,685 A | 11/1994 | Gosling | |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

Servicenow, Logs for Horizontal Discovery, Mar. 17, 2023.
Servicenow, Tokyo Now Intelligence, Mar. 24, 2023.
U.S. Appl. No. 18/095,332, filed Jan. 10, 2023.

*Primary Examiner* — June Sison
(74) *Attorney, Agent, or Firm* — McDonnell Boehnen Hulbert & Berghoff LLP

(57) ABSTRACT

A method includes obtaining a discovery pattern that indicates a plurality of operations associated with a corresponding computing resource type of a plurality of computing resource types. The method also includes identifying a variable parameter value associated with execution of the discovery pattern with respect to a computing resource of the corresponding computing resource type, and determining an error value by using a machine learning model to process the variable parameter value. The error value indicates a likelihood that execution of the discovery pattern, when associated with the variable parameter value, with respect to the particular computing resource results in a corresponding error type. The method further includes receiving, based on the error value, an input comprising one or more of (i) an instruction to execute the discovery pattern or (ii) a modification applicable to the variable parameter value.

20 Claims, 10 Drawing Sheets

(56) References Cited

U.S. PATENT DOCUMENTS

| | | |
|---|---|---|
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,402,257 B2 | 9/2019 | Palla |
| 10,666,743 B2 | 5/2020 | Sahoo |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,990,616 B2 | 4/2021 | Debnath |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,924,033 B2 * | 3/2024 | Aharon ................. H04L 67/10 |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2018/0123940 A1 | 5/2018 | Rimar |
| 2019/0073257 A1 | 3/2019 | Dasgupta |
| 2019/0104398 A1 | 4/2019 | Owen |
| 2019/0377818 A1 * | 12/2019 | Andritsos ............ G06F 16/2465 |
| 2020/0050689 A1 | 2/2020 | Tal |
| 2020/0204443 A1 | 6/2020 | Bar Oz |
| 2020/0301678 A1 | 9/2020 | Burman |
| 2020/0328941 A1 * | 10/2020 | Feiguine ............ H04L 41/0895 |
| 2020/0409715 A1 * | 12/2020 | Balasubramanian ........................ G06F 11/3065 |
| 2021/0194764 A1 | 6/2021 | Badyan |
| 2022/0029886 A1 | 1/2022 | Hameiri |
| 2024/0007414 A1 * | 1/2024 | Jain ......................... G06F 9/505 |

FOREIGN PATENT DOCUMENTS

| | | | |
|---|---|---|---|
| WO | 9934285 W | | 7/1999 |
| WO | 0052559 W | | 9/2000 |
| WO | 0179970 W | | 10/2001 |

\* cited by examiner

DISCOVERY TROUBLESHOOTING BASED ON MACHINE LEARNING

BACKGROUND

A discovery pattern may facilitate identification of various computing resources, attributes thereof, and relationships therebetween. A discovery pattern may encounter an error during its execution for a plurality of different reasons. It is beneficial to identify likely errors of a discovery pattern, and to fix the causes of such errors, before attempting execution of the discovery pattern.

SUMMARY

A discovery application may be configured to provide a plurality of different discovery patterns for discovery of a plurality of different types of computing resources, thus allowing a computer network to be mapped and visualized. Each respective discovery pattern may include a plurality of discovery operations configured to obtain information about a corresponding type of computing resource, and variable parameters in association with which the discovery pattern is executed. The variable parameters may include input(s) of the respective discovery pattern, attribute(s) of prior executions of the respective discovery pattern, and/or attribute(s) of a context in which the respective discovery pattern is planned to be executed, among others. Thus, while the discovery operations may be constant across different executions of the respective discovery pattern, values of the variable parameters may change across different executions of the respective discovery pattern.

The discovery patterns may experience a plurality of different error types, and may thus fail to obtain at least some information about a corresponding computing resource. Occurrence of an error during execution of a discovery pattern may result in a waste of computing resources and/or electrical power, especially when the discovery pattern includes a large number of operations. The complexity of the computer networks undergoing discovery may make it difficult to avoid and/or correct errors. Additionally, once an error is identified, it may be difficult to manually identify and modify parts of the discovery pattern to avoid the error. For example, it may be difficult to manually parse log data generated by the discovery pattern to identify the error, the cause thereof, and the modifications thereto that will avoid the error.

Identification and avoidance of discovery pattern errors may be facilitated by one or more machine learning (ML) models. The one or more ML models may be configured to use values of the variable parameters of the respective discovery pattern as input features in determining error value(s) for the respective discovery pattern. The error value(s) may indicate a likelihood of the respective discovery pattern experiencing an error if it is executed in association with the values of the variable parameters.

In some implementation, the one or more ML models may include a single ML model that is configured to determine, for each respective error type of the plurality of error types, a corresponding error value. In other implementations, the one or more ML models may include a plurality of ML models, with each respective ML model of the plurality of ML models being configured to generate error values for a corresponding error type of the plurality of error types. Each respective error type may be associated with one or more corresponding variable parameters that are likely to cause the respective error type. The one or more corresponding variable parameters may be predetermined based on the error type, and/or empirically determined based on log data generated in connection with execution of the discovery patterns.

The discovery application may use the error values generated by the one or more ML models to control execution of the discovery patterns. For example, when the error value of a particular error type exceeds a threshold error value for the particular error type, the discovery application may be configured to block execution of the discovery pattern. Execution of the discovery pattern may be blocked until, for example, the user modifies one or more values of the variable parameters and/or the error value is, as a result of the modified variable parameter values, reduced to below the threshold value. Thus, by using the ML models, the discovery application may conserve computing resources and electrical power by allowing potential errors to be identified and corrected prior to attempting execution of discovery patterns that are likely to fail. Additionally, the discovery application may be configured to suggest variable parameters to modify to correct the potential errors, thus facilitating the error resolution process.

Accordingly, a first example embodiment may involve obtaining a discovery pattern that indicates a plurality of operations associated with a corresponding computing resource type of a plurality of computing resource types. The first example embodiment may also include identifying a variable parameter value associated with execution of the discovery pattern with respect to a computing resource of the corresponding computing resource type. The first example embodiment may additionally include determining an error value by using a machine learning model to process the variable parameter value. The error value may indicate a likelihood that execution of the discovery pattern, when associated with the variable parameter value, with respect to the computing resource results in a corresponding error type. The first example embodiment may further include receiving, based on the error value, an input that includes one or more of (i) an instruction to execute the discovery pattern or (ii) a modification applicable to the variable parameter value.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
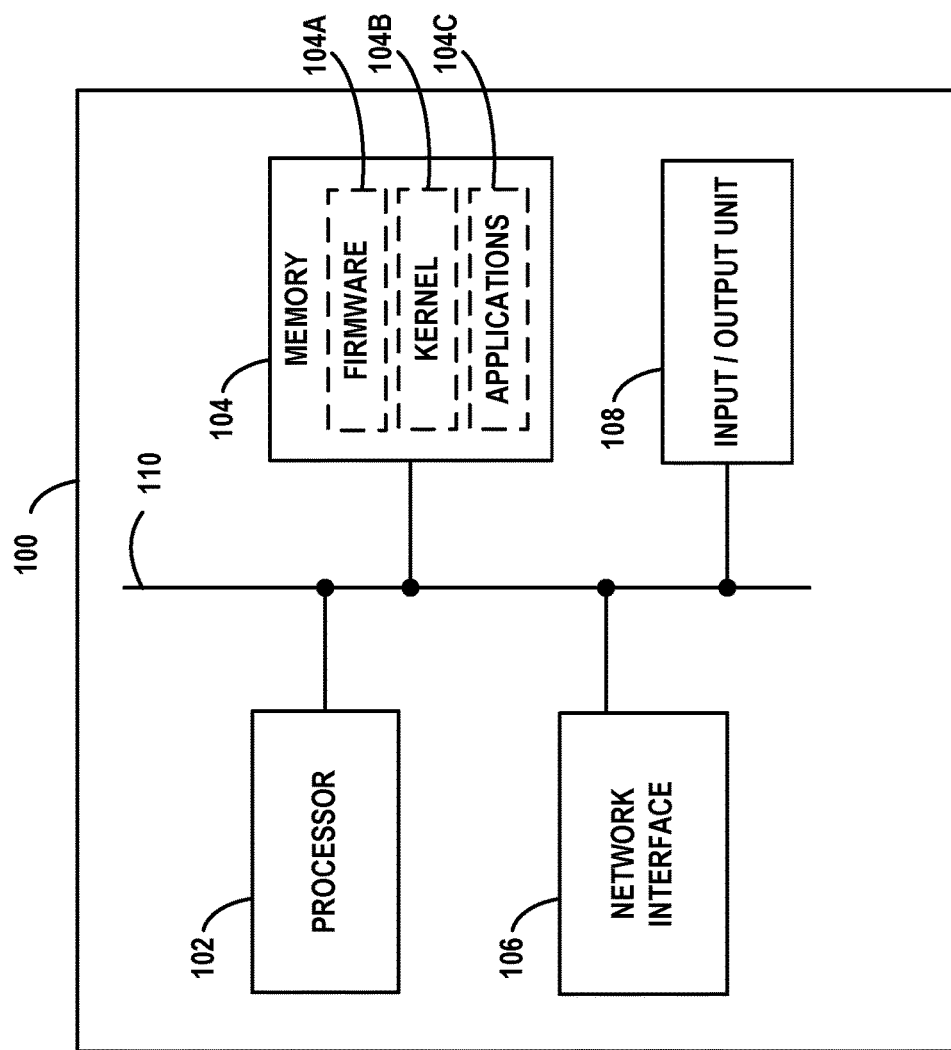
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
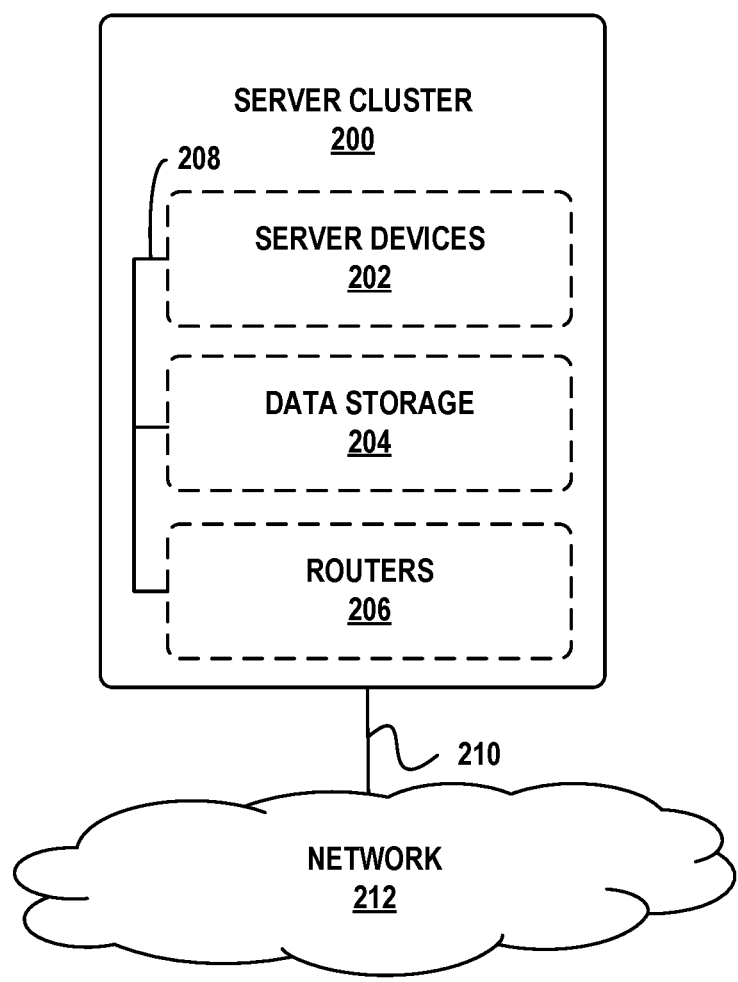
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
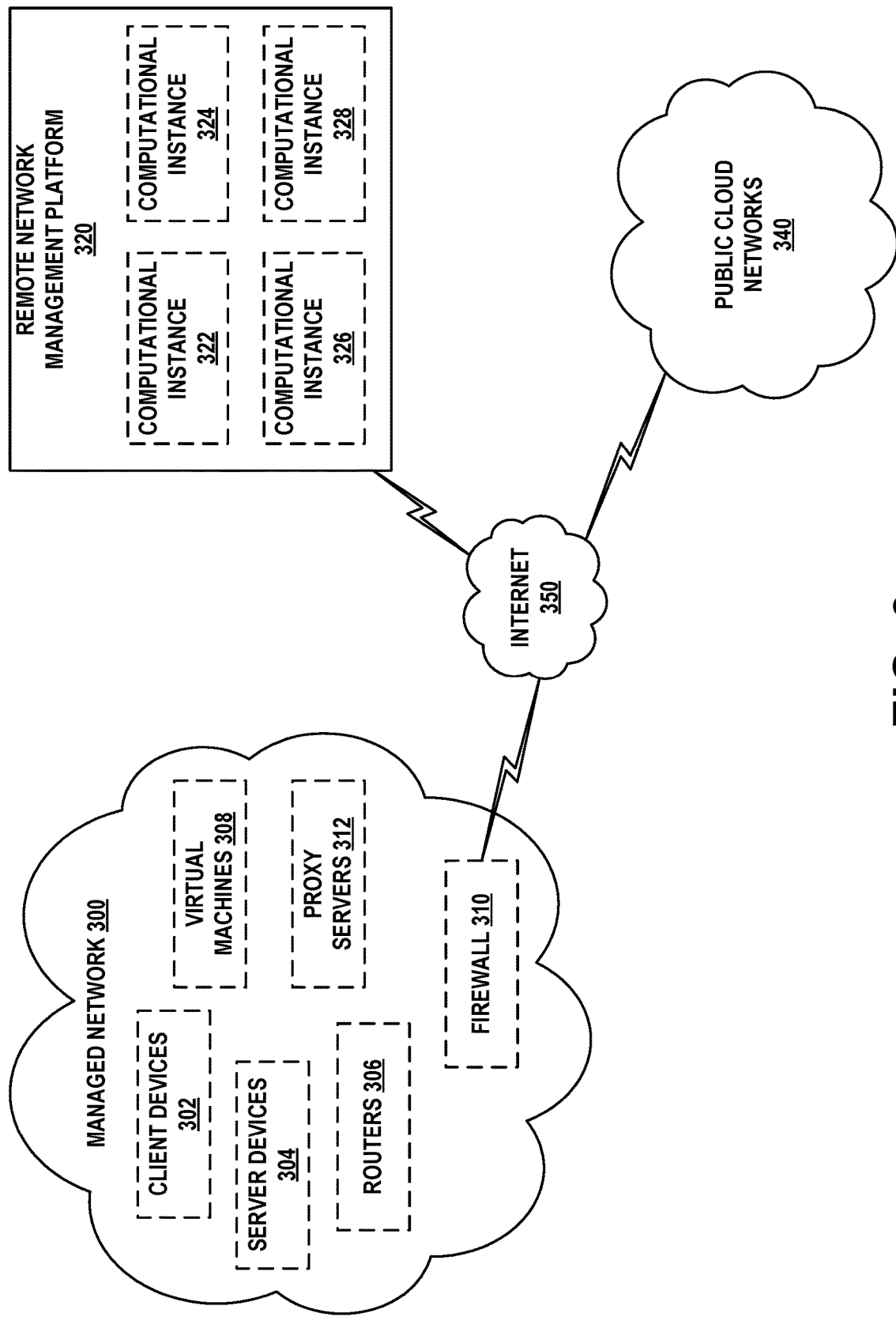
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
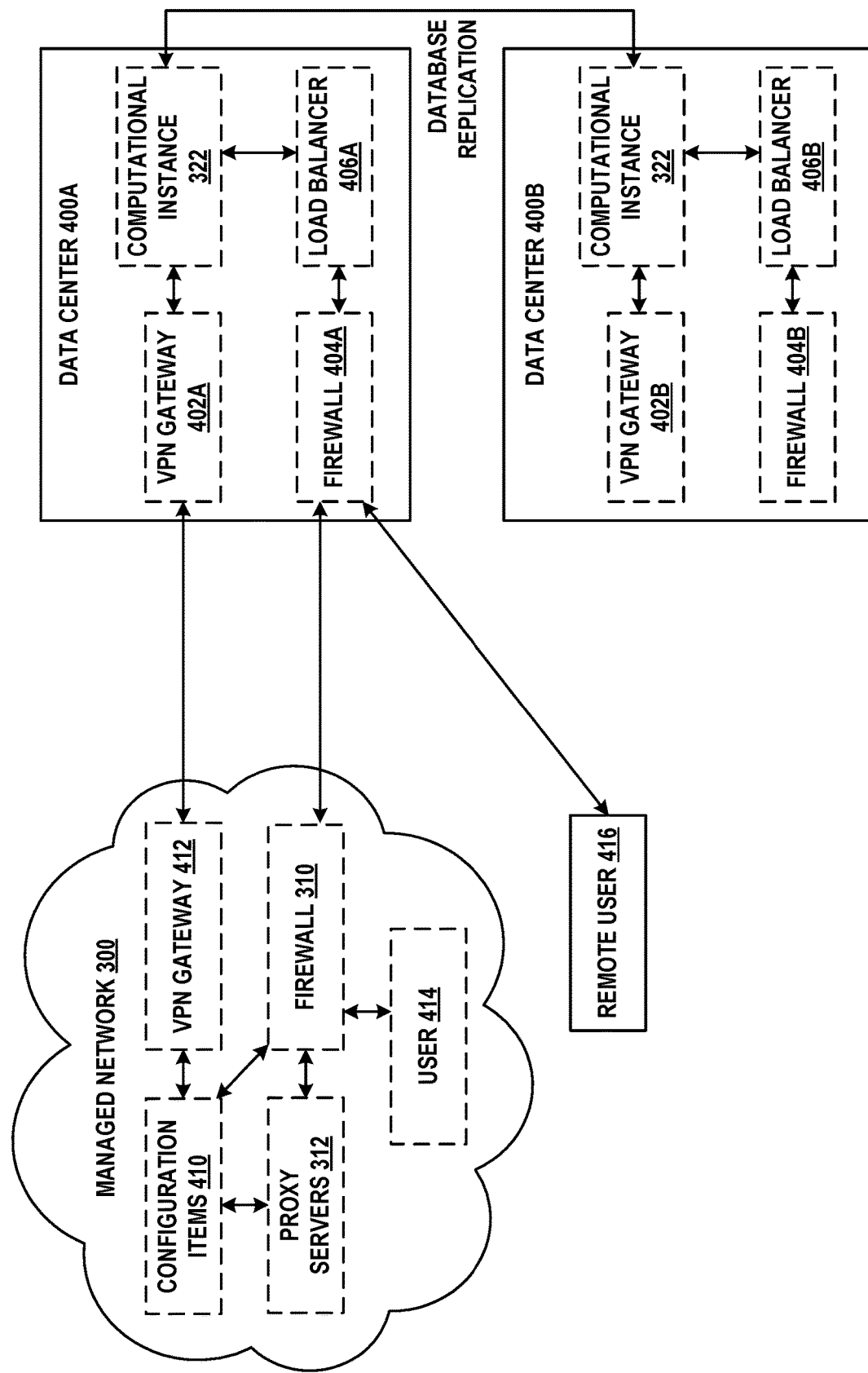
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
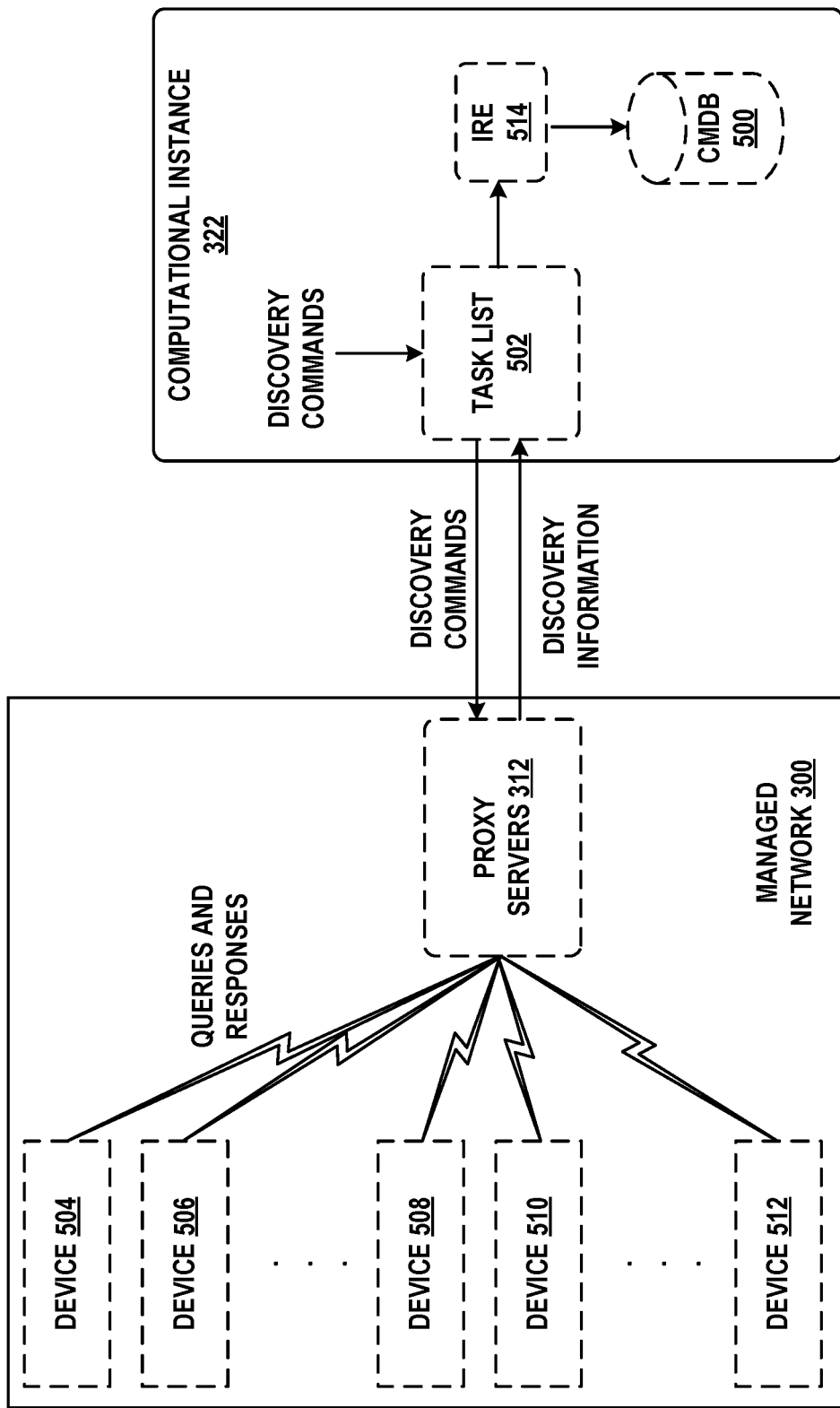
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each is discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE DISCOVERY APPLICATION

Figure 6:
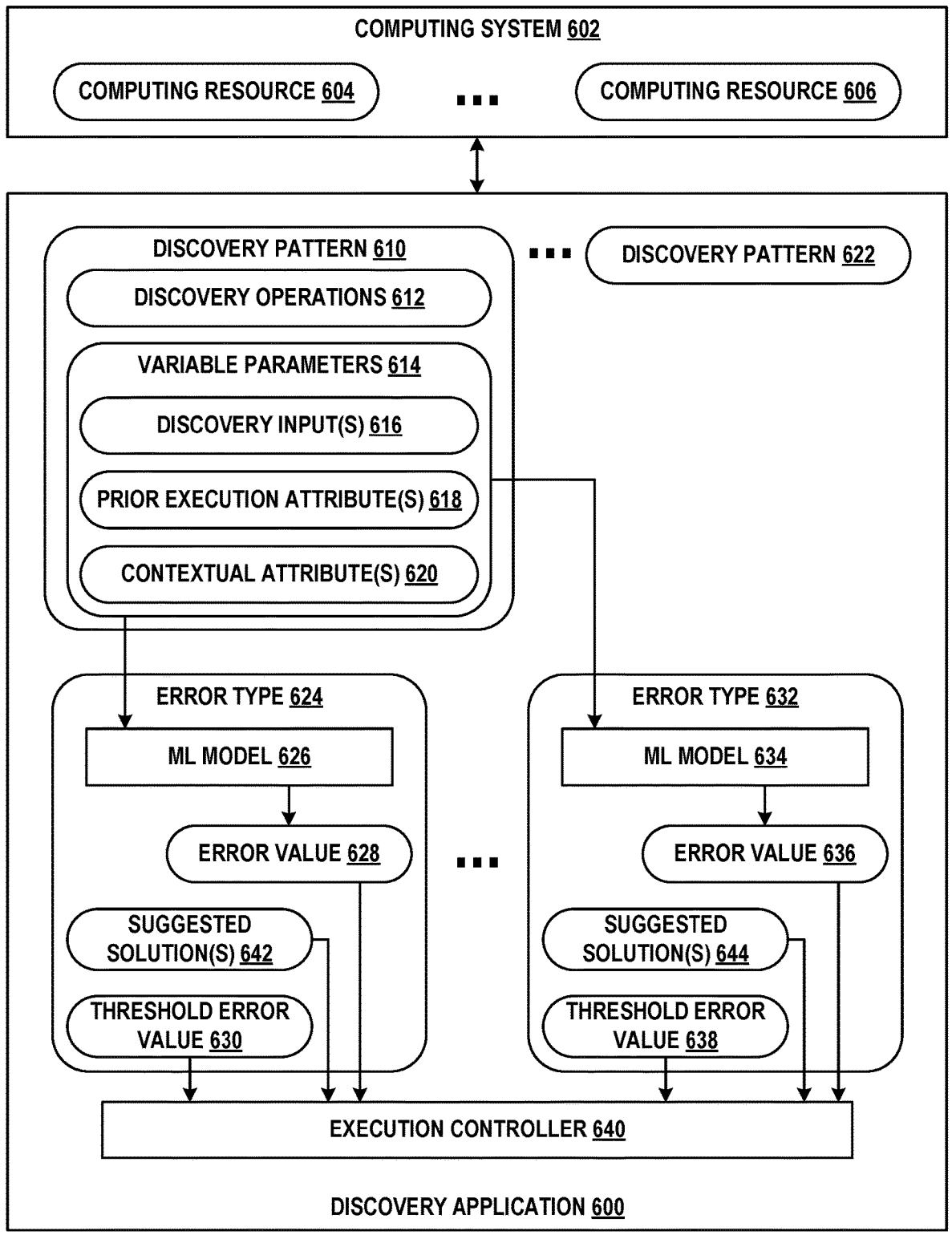
FIG. 6 illustrates a discovery application, in accordance with example embodiments.

FIG. 6 illustrates an example discovery application 600. Discovery application 600 may be configured to execute discovery patterns that are configured to obtain information about computing resources in various computing systems. Thus, discovery application 600 may be configured to execute discovery pattern 610 through discovery pattern 622 (i.e., discovery patterns 610-622). For example, discovery patterns 610-622 may be configured to obtain information about the computing resources of computing system 602, including computing resource 604 through computing resource 606 (i.e., computing resources 604-606). Computing system 602 may represent managed network 300, public cloud networks 340, and/or components thereof.

Errors in the execution of a discovery pattern may be computationally costly, and may cause a partial or complete failure of the discovery pattern. For example, unsuccessful execution of the discovery pattern might consume computational resources (e.g., processor time, network bandwidth, etc.) and electrical power but might not, due to the error, generate useful and/or complete output data. Thus, the discovery pattern may be modified to fix and/or avoid the error, and may then be re-executed in an attempt to generate useful and/or complete output data. Modifications of the discovery pattern may remedy the error, but might take up developer time. Accordingly, it is desirable to identify and fix potential errors in the execution of discovery patterns prior to execution of the discovery patterns.

Accordingly, discovery application 600 may include one or more ML models configured to identify potential errors in discovery patterns 610-622. Additionally, discovery application 600 may be configured to suggest modifications to discovery patterns 610-622 to remedy the identified potential errors. Specifically, discovery application 600 may include ML model 626 through ML model 634 (i.e., ML models 626-634), and execution controller 640. ML models 626-634 may be configured to identify potential errors at least in discovery pattern 610, thereby allowing these potential errors to be fixed prior to execution of discovery pattern 610, which may increase the likelihood of successful (e.g., error-free) execution of discovery pattern 610.

Each of discovery patterns 610-622 may include a corresponding plurality of operations configured to acquire information about a corresponding type of computing resource. For example, discovery pattern 610 may correspond to a first type of computing resource (e.g., an Amazon AWS Cloud server), which may be represented by computing resource 604. Discovery pattern 622 may correspond to a second type of computing resource (e.g., an Amazon AWS Cloud database), which may be represented by computing resource 606. Thus, discovery patterns 610-622 may be configured to collectively discover some or all of the different types of computing resources found in computing system 602.

Each of discovery patterns 610-622 may be associated with and/or include a corresponding plurality of discovery operations and corresponding one or more variable parameters. For example, discovery pattern 610 may include discovery operations 612 and variable parameters 614. Discovery operations 612 may define a plurality of steps for acquiring information about the corresponding type of computing resource. Discovery operations 612 may be predetermined and/or fixed across different executions of discovery pattern 610. For examples, discovery operations 612 may correspond to source code that is modifiable by a developer of discovery pattern 610, but is not modifiable by users to discovery pattern 610. Thus, in some cases, discovery operations 612 may be alternatively referred to as non-variable code 612 of discovery pattern 610.

Variable parameters 614 may be associated with execution of discovery pattern 610 with respect to a particular instantiation of the corresponding type of computing resource. Thus, variable parameters 614 may vary across different executions of discovery pattern 610. The different executions of discovery pattern 610 may differ from one another in the computing system in which discovery pattern 610 is discovering computing resources, the managed network on behalf of which discovery pattern 610 is discovering computing resources, and/or a context in which discovery pattern 610 is being executed, among other differences. Thus, variable parameters 614 may be at least partly controllable by the users of discovery pattern 610.

Variable parameters 614 may include discovery input(s) 616, prior execution attribute(s) 618, and contextual attribute(s) 620. Discovery input(s) 616 may include one or more input values configured to adapt discovery operations 612 to execute with respect to a particular computing system (e.g., computing system 602) and/or a particular instantiation of the corresponding computing resource. Discovery input(s) 616 may be modifiable using one or more GUIs provided by discovery application 600. For example, discovery input(s) 616 may include credentials and/or tokens configured to authorize discovery pattern 610 to access computing system 602 and/or computing resources 604-606, a destination for the discovered configuration items, a batch size of discovery pattern 610 (i.e., a minimum number of configuration items identified by another discovery pattern that triggers execution of discovery pattern 610), and/or a number of permitted execution retries of discovery pattern 610, among other possible inputs.

Prior execution attribute(s) 618 may include one or more inputs, one or more outputs, and/or one or more performance metrics of one or more prior executions of discovery patterns 610-622. For example, prior execution attribute(s) 618 may represent prior successes, failures, errors, and/or other results of executing discovery patterns 610-622. Thus, prior execution attribute(s) 618 may be indicative of potential errors caused by dependencies and/or interconnections across multiple executions of one or more discovery pattern.

Contextual attribute(s) 620 may represent one or more values that describe a context in which an execution of discovery pattern 610 is planned to occur. Contextual attribute(s) 620 may include parameters and/or properties of computing system 602, computing resources 604-606, and/or a managed network on behalf of which discovery application 600 is operating. For example, contextual attribute(s) 620 may indicate a geolocation of computing system 602 and/or the managed network, network parameters associated with computing system 602 and/or the managed network, resource utilization of computing system 602, and/or various settings associated with computing system 602 and/or the managed network, among other possibilities.

Each of discovery patterns 610-622 might fail to execute successfully for a plurality of possible reasons. For example, discovery pattern 610 might fail to successfully execute due to error type 624 through error type 632 (i.e., error types 624-632). Each of error types 624-632 may represent a corresponding possible problem that could prevent discovery pattern 610 from executing successfully. For example, each respective error type of error types 624-632 may be associated with one or more corresponding combinations of values of variable parameters 614 that cause the respective error type to occur. Error types 624-632 may represent manual classifications of possible conditions that prevent discovery pattern 610 from successfully completing its execution.

Error types 624-632 may include a bad request error, a graceful termination error, a throttling error, a socket timeout error, and/or a permissions error, among other possibilities. The bad request error may indicate that a request made by discovery pattern 610 to computing system 602 is invalid. The graceful termination error may indicate that a particular computing resource sought to be discovered by discovery pattern 610 does not exist in computing system 602. The throttling error may indicate that a number of requests to from discovery application 600 to computing system 602 exceeds a threshold number of requests. The socket timeout error may indicate that a flow of data from computing system 602 to discovery application 600 has been interrupted. A permissions error may indicate that the discovery pattern is not permitted to access the information about the particular computing resource.

In some implementations, each respective error type of error types 624-632 may be associated with a corresponding ML model configured to predict, based on one or more values of variable parameters 614, how likely the respective error type is to occur. For example, error type 624 may be associated with ML model 626, and error type 632 may be associated with ML model 634. ML model 626 may be configured to generate error value 628 based on one or more values of variable parameters 614, and ML model 634 may be configured to generate error value 636 based on one or more values of variable parameters 614. Error value 628 may represent a likelihood of error type 624 occurring if discovery pattern 610 is executed in association with the one or more values of variable parameters 614. Error value 636 may represent a likelihood of error type 632 occurring if discovery pattern 610 is executed in association with the one or more values of variable parameters 614. The one or more values of variable parameters 614 processed by ML model 626 may differ from the one or more values of variable parameters 614 processed by ML model 634.

ML models 626-634 may include, for example, artificial neural networks, linear regression models, nonlinear regression models, decision trees, and/or random forests, among other possibilities.

ML models 626-634 may be configured to generate, respectively, error value 628 through error value 636 (i.e., error values 628-636) based on processing the values of variable parameters 614 because the values of variable parameters 614 may represent possible causes of failure of discovery pattern 610. ML models 626-634 might not process discovery operations 612 because, absent software updates, discovery operations 612 may remain constant over time, and thus (absent software defects) are not expected to represent causes of errors. Additionally, variable parameters 614 may be modifiable and/or controllable by the user of discovery application 600, and thus any errors attributable to variable parameters 614 may be resolvable by the user of discovery application 600. When discovery operations 612 are updated, ML models 626-634 may be retrained to account for any changes in how variable parameters 614 interact with updated discovery operations 612 to cause errors.

In some implementations, discovery pattern 622 and/or any other discovery patterns provided by discovery application 600, as indicated by the ellipsis, may be associated with a corresponding plurality of ML models for error types 624-632. For example, the corresponding plurality of ML models for discovery pattern 622 may be pattern-specific. That is, for example, while error type 624 for discovery pattern 610 may be predicted using ML model 626, error type 624 for discovery pattern 622 may be predicted using a different ML model that is specific to discovery pattern 622 (and error type 624). Similarly, while error type 632 for discovery pattern 610 may be predicted using ML model 634, error type 632 for discovery pattern 622 may be predicted using a different ML model that is specific to discovery pattern 622 (and error type 632).

In other implementations, ML models 626-634 may be pattern-agnostic. Thus, for example, ML model 626 may be used to predict error type 624 across each of discovery patterns 610-622. Similarly, ML model 634 may be used to predict error type 632 across each of discovery patterns 610-622.

In further implementations, rather than including multiple ML models 626-632, discovery application 600 may instead include a single ML model configured to predict any one of error types 624-632 for one or more of discovery patterns 610-622. This single ML model may be pattern-specific or pattern-agnostic. For example, the ML model may be configured to generate a plurality of outputs (e.g., using a plurality of output neurons) corresponding to error types 624-632, with each respective output of the plurality of outputs representing the error value of a corresponding error type of error types 624-632. Using a single ML model across error types 614-632 and/or discovery patterns 610-622 may allow for transfer learning across error types and/or discovery patterns, thus allowing such an ML model to be trained using fewer training samples per error type and/or per discovery pattern.

ML models 626-634 may be trained using log data generated in connection with prior executions of discovery patterns 610-622. For example, the log data may represent training values of variable parameters 614 present in connection with the prior executions of discovery pattern 610, and outcomes of the prior executions of discovery pattern 610. The outcomes of the prior executions of discovery pattern 610 may indicate whether any of error types 624-632 occurred during the prior executions, and may thus provide the ground-truth data for training of ML models 626-634.

The log data may include internal log data and/or external log data. Log data may be considered internal with respect to a particular managed network when the log data is generated in connection with executing discovery patterns 610-622 on behalf of the particular managed network. Internal log data may be used to train network-specific versions of ML models 626-634 for the particular managed network. Log data may be considered external with respect to the particular managed network when the log data is generated in connection executing discovery patterns 610-622 on behalf of one or more managed networks other than the particular managed network. External log data may be used to train network-agnostic versions of ML models 626-634 configured to be used with any managed network.

In some implementations, ML models 626-634 may be pre-trained using the external log data and subsequently fine-tuned using the internal log data. Pre-training ML models 626-634 on the external log data may allow ML models 626-634 to learn to predict errors based on combinations of values of variable parameters 614 that might not be represented in the internal log data. Fine-tuning ML models 626-634 on the internal log data may allow ML models 626-634 to retain relevant learning from pre-training, and better learn to predict errors based on combinations of values of variable parameters 614 that may be overrepresented in the internal log data and/or that might not be represented in the external log data.

Each respective error type of error types 624-632 may also be associated with a corresponding threshold error value that, when exceeded by the error value generated by the corresponding ML model, indicates that the respective error type is sufficiently likely to occur such that variable parameters 614 should be modified prior to execution of discovery pattern 610. For example, error type 624 may be associated with threshold error value 630, and error type 632 may be associated with threshold error value 638. The corresponding threshold error value may separate (i) cases where a potential error is sufficiently likely to occur that it should be proactively fixed from (ii) cases where the potential error is sufficiently unlikely to occur that execution of discovery pattern 610 may be attempted without proactively fixing the potential error.

Threshold error values 630-638 may differ from one another to, for example, account for differences in the severity of each of error types 624-632. For example, when error type 624 is considered more severe than error type 632, threshold error value 630 may be lower than threshold error value 638. In some implementations, threshold error values 630-638 may be selected such that an expected value (i.e., the product of error likelihood and error severity) across error types is approximately constant. In some implementations, the same threshold error values 630-638 may be used with respect to each of discovery patterns 610-622. In other implementations, each of discovery patterns 610-622 may be associated with a corresponding set of pattern-specific threshold error values for error types 624-632. Threshold error values 630-638 may, in some cases, be modifiable by, for example, a user of discovery application 600.

Each respective error type of error types 624-632 may also be associated with one or more corresponding solutions that, if implemented, are likely to resolve the respective error type. For example, error type 624 may be associated with suggested solution(s) 642 and error type 632 may be associated with suggested solution(s) 644. Suggested solution(s) 642 through suggested solution(s) 644 (i.e., suggested solutions 642-644) may identify respective subsets of variable parameters 614 and/or values thereof that cause error types 624-632. For example, suggested solution(s) 642 may indicate that a first discovery input of discovery input(s) 616 is associated with occurrence of error type 624, and/or that a particular value of the first discovery input is associated with occurrence of error type 624.

In some implementations, suggested solution(s) 642 may be manually defined by a developer and/or a user based on error type 624. For example, some of error types 624-632 may be inherently and/or logically associated with corresponding suggested solutions. For example, a permissions error may be avoidable by providing correct permissions, and therefore the suggested solution(s) therefor may represent a modification to one or more permissions parameters of variable parameters 614. A credentials error may be avoidable by providing correct credentials, and therefore the suggested solution(s) therefor may represent a modification to one or more credential parameters of variable parameters 614.

Additionally or alternatively, suggested solution(s) 642 may be empirically determined based on the log data. For example, first log data associated with a failed attempt at execution of discovery pattern 610 may be compared to second log data associated with a subsequent successful attempt at execution of discovery pattern 610. Differences in the values of variable parameters 614 between the first log data and the second log data may be indicative of parameters and/or values thereof that could have fixed and/or likely fixed the corresponding error.

Execution controller 640 may be configured to control execution of discovery patterns 610-622 based on the error values and the threshold error values thereof. Thus, execution controller 640 may be configured to control execution of discovery pattern 610 based on error values 628-636 and threshold error values 630-638. For example, when error value 628 exceeds threshold error value 630, execution controller 640 may generate an indication that error type 624 is likely to occur.

In some implementations, generating the indication that error type 624 is likely to occur may involve displaying a visual prompt by way of a GUI provided by discovery application 600 (e.g., by way of a client device utilized by a user). The visual prompt may indicate that suggested solution(s) 642 should be implemented (e.g., the first variable parameter should be modified) prior to execution of discovery pattern 610. Additionally or alternatively, the visual prompt may include the threshold error value 630 and the error value 628, which may allow the user to assess the likelihood of error type 624 occurring and make a more informed decision about whether to execute or modify discovery pattern 610.

In some implementations, execution controller 640 may be configured to block execution of discovery pattern 610 until suggested solution(s) 642 are implemented, and/or at least one of variable parameters 614 is modified. For example, execution controller 640 may be configured to determine whether a corresponding value of at least one variable parameter indicated by suggested solution(s) 642 has been modified since the determination of error value 628. Thus, execution controller 640 may be configured to prevent users from attempting to execute discovery patterns that are likely to fail until a remedy of likely cause of such failures is at least attempted.

After the corresponding value of the at least one variable parameter is modified, discovery application 600 may be configured to cause ML model 626 to process the modified values of variable parameters 614 to generate an updated error value 628. Execution controller 640 may be configured to allow execution of discovery pattern 610 if error value 628 as updated does not exceed threshold error value 630, and may be configured to continue to block execution of discovery pattern 610 if error value 628 as updated exceeds threshold error value 630. In some cases, a user may be able to override the blocking by execution controller 640 and cause execution of any of discovery patterns 610-622 regardless of the error values determined therefor.

VII. EXAMPLE DISCOVERY, TRAINING, AND INFERENCE OPERATIONS

Figure 7A:
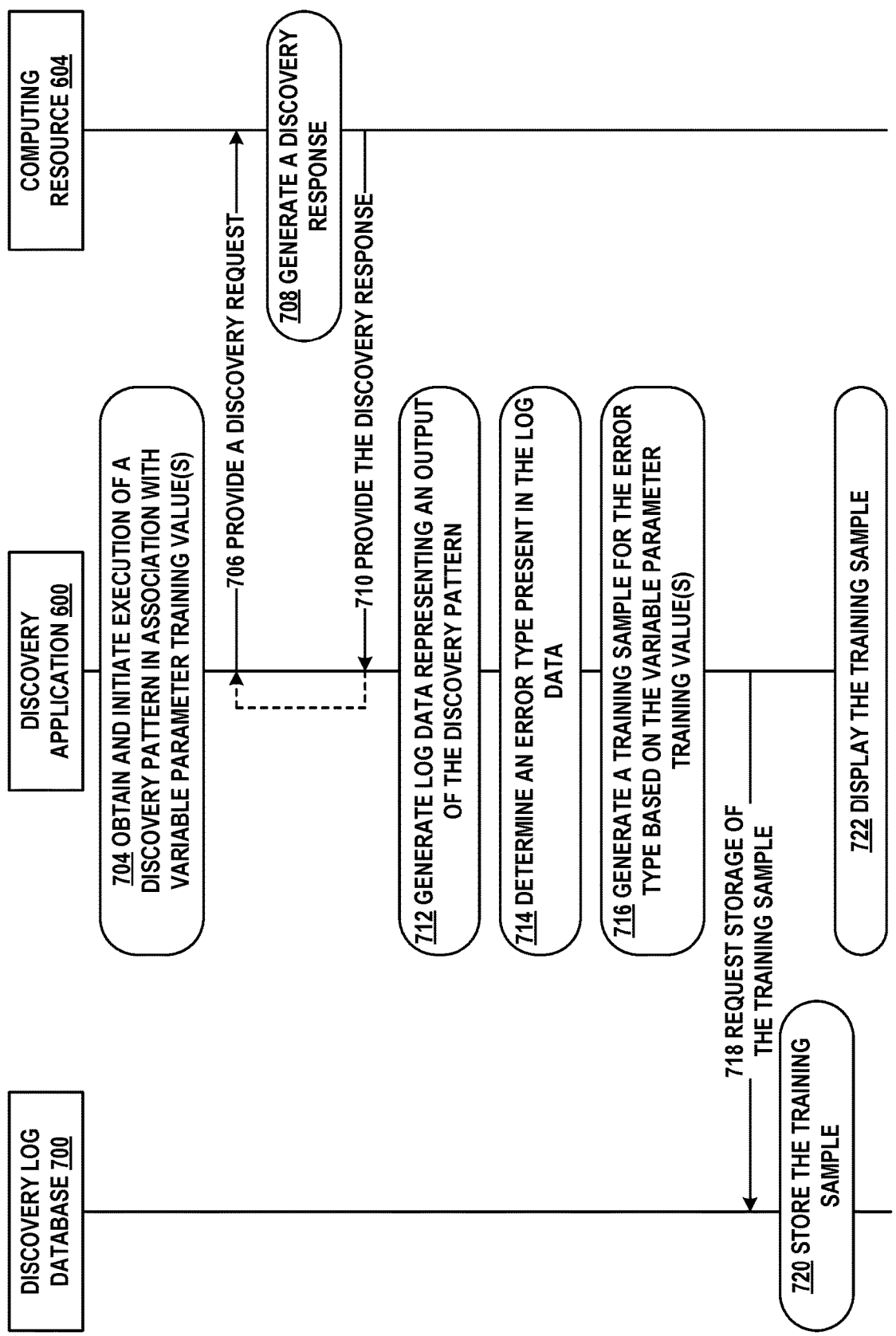
FIGS. 7A, 7B, and 7C are message flow diagrams, in accordance with example embodiments.
Figure 7B:
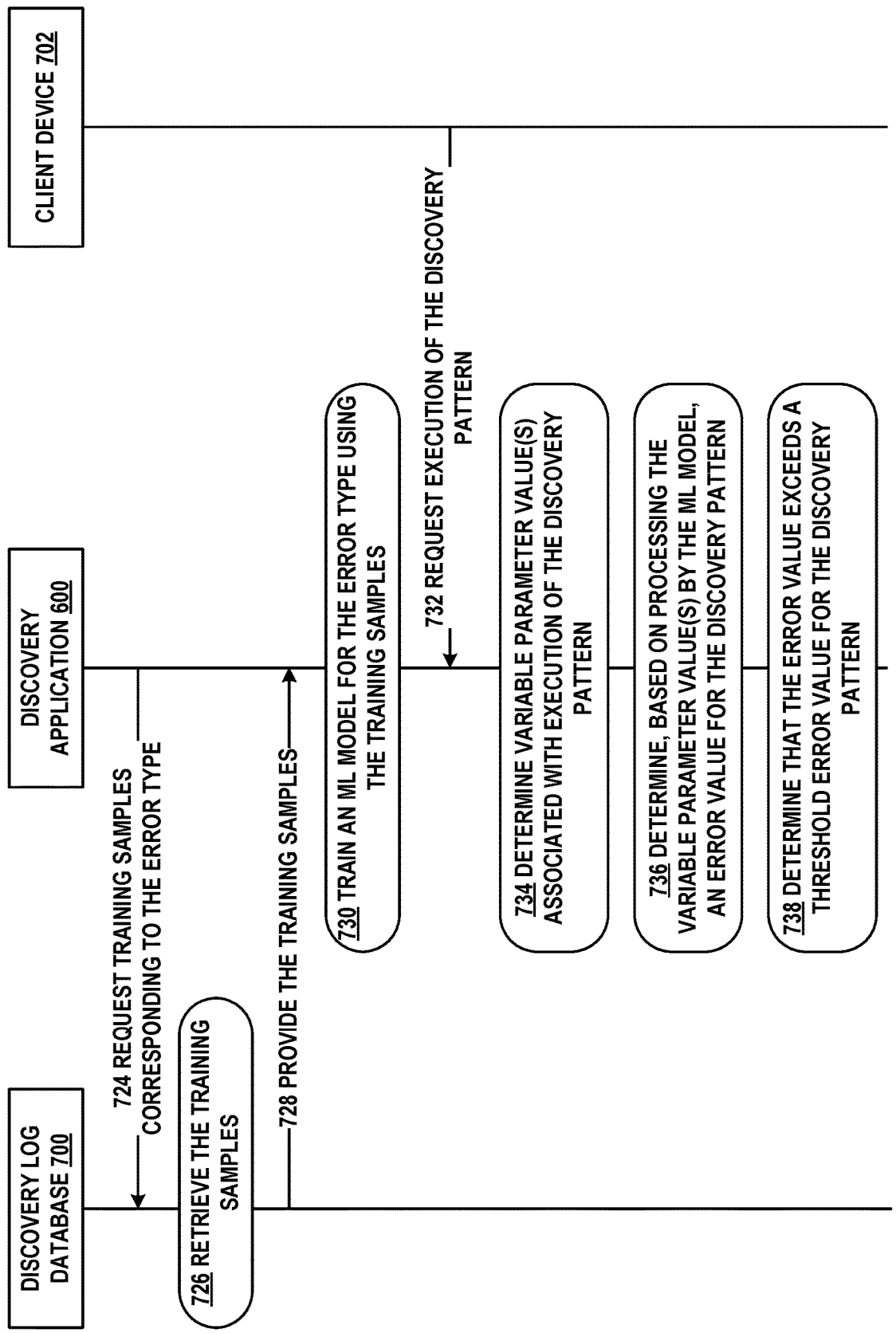
Figure 7C:
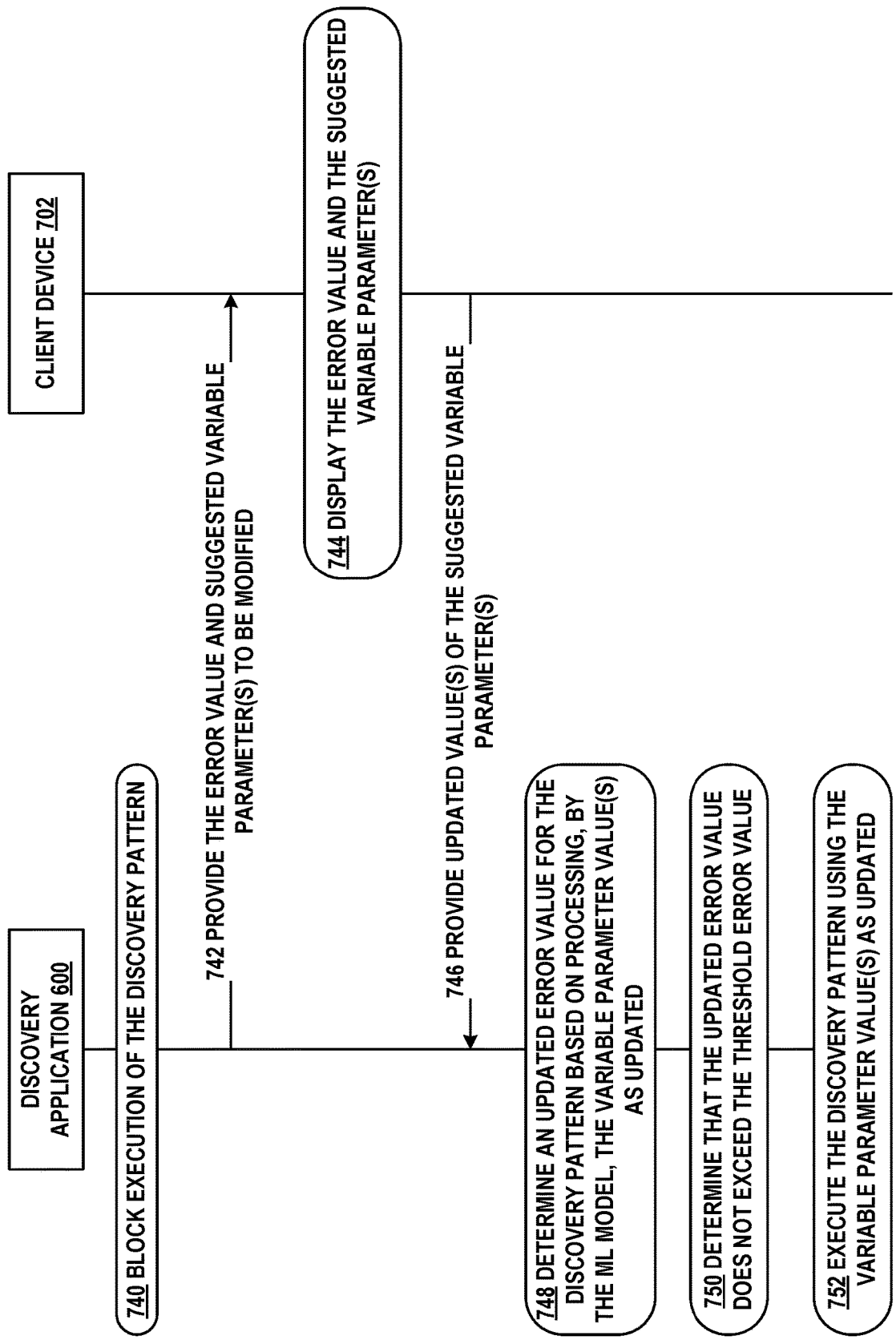

FIGS. 7A, 7B, and 7C illustrate example operations related to training of the ML models of discovery application 600 and using the trained ML models to predict errors in execution of discovery patterns. Discovery application 600 may use discovery log database 700 to store discovery log data and/or training samples generated based thereon. Client device 702 (shown in FIGS. 7B and 7C) may be used to access and control operations of discovery application 600. In one example, discovery application 600 and discovery log database 700 may be provided by a computational instance of remote network management platform 320, computing resource 604 may be located within managed network 300 or public cloud networks 340, and client device 702 may be part of managed network 300.

Discovery application 600 may be configured to obtain and initiate execution of a discovery pattern in association with variable parameter training value(s), as indicated by block 704. For example, in the case of discovery pattern 610, the variable parameter training value(s) may include values of any one or more of variable parameters 614. The discovery pattern being executed in association with the variable parameter training value(s) may include the discovery pattern using the variable parameter training value(s) (e.g., as input(s)) and/or the variable parameter training value(s) forming part of a system, context, and/or circumstances in which the discovery pattern is executing.

Based on and/or in response to initiating execution of the discovery pattern at block 704, discovery application 600 may be configured to provide, to computing resource 604, a discovery request, as indicated by arrow 706. Based on and/or in response to reception of the discovery request at arrow 706, computing resource 604 may be configured to generate a discovery response, as indicated by block 708. Based on and/or in response to generation of the discovery response at block 708, computing resource 604 may be configured to provide, to discovery application 600, the discovery response, as indicated by arrow 710.

The operations of arrow 706, block 708, and arrow 710 may be repeated one or more times with respect to one or more additional computing resources (e.g., computing resource 606) until execution of the discovery pattern is completed or an error is encountered. In order to generate training data for the ML models of discovery application 600, the operations of block 704 through arrow 710 may be executed regardless of whether the discovery pattern is expected to complete successfully or result in an error. The operations of block 704 through arrow 710 may be executed incidentally to performing a normal discovery process, and/or as part of a distinct discovery process intended for training data generation.

Based on and/or in response to completion of execution of the discovery pattern and/or occurrence of an error during execution of the discovery pattern, discovery application 600 may be configured to generate log data representing an output of the discovery pattern, as indicated by block 712. The log data may include a representation of (i) the values of any variable parameters of the discovery pattern, (ii) inputs, outputs, and/or intermediate results of any discovery operations that make up the discovery pattern, and/or (iii) any data generated by computing resource 604 at block 708, among other possible data.

In cases where the output of the discovery pattern includes an error, based on and/or in response to generation of the log data at block 712, discovery application 600 may be configured to determine an error type present in the log data, as indicated by block 714. Determining the error type may involve parsing the log data for one or more predetermined values (e.g., integers, strings, etc.) that represent occurrence of the error type.

Based on and/or in response to determination of the error type at block 714, discovery application 600 may be configured to generate a training sample for the error type based on the variable parameter training value(s), as indicated by block 716. The training sample may include (i) ground-truth data in the form of a representation of the error type and (ii) the variable parameter training value(s) that were associated with occurrence of the error during execution of the discovery pattern.

In cases where the discover pattern completes successfully (i.e., the log data does not include any errors), discovery application 600 may be configured to generate a training sample that includes (i) ground-truth data in the form of a representation of successful completion of the discovery pattern and (ii) the variable parameter training value(s) that were associated with the successful execution of the discovery pattern. Such an error-free training sample may be used for training any one of the ML models of discovery application 600, since it illustrates conditions under which no error should be predicted to occur.

Based on and/or in response to generation of the training sample at block 716, discovery application 600 may be configured to transmit, to discovery log database 700, a request for storage of the training sample, as indicated by arrow 718. Based on and/or in response to reception of the request at arrow 718, discovery log database 700 may be configured to store the training sample, as indicated by block 720.

Based on and/or in response to generation of the training sample at block 716 and/or storage of the training sample at block 720, discovery application 600 may be configured to display the training sample, as indicated by block 722. Displaying the training sample may allow a user of discovery application 600 to more easily understand the cause of the error encountered during execution of the discovery pattern. For example, rather than having to manually parse the log data, displaying the training sample may allow the user to quickly identify the error and its potential cause(s).

The operations of block 704 through block 722 may be repeated using other discovery patterns with respect to other computing resources, thereby generating a plurality of training samples with respect to each discovery pattern and/or error type.

In some implementations, the plurality of training samples may be aggregated into a table that displays, for each respective discovery pattern provided by discovery application 600, a number of times that each error type occurred in the course of execution of the respective discovery pattern. The plurality of training samples may be generated in connection with discovery operations carried out on behalf of a particular managed network, and may thus represent a network-specific summary of discovery outcomes. The table may be interactive, and selection of a particular discovery pattern and/or error type may cause discovery application 600 to display additional details from the log data associated with the particular discovery pattern and/or error type. Thus, the information from the log data may be viewable at different levels of granularity, thereby facilitating debugging of the discovery patterns.

Turning to FIG. 7B, discovery application 600 may be configured to transmit, to discovery log database, a request for training samples corresponding to the error type, as indicated by arrow 724. Based on and/or in response to reception of the request at arrow 724, discovery log database 700 may be configured to retrieve the training samples, as indicated by block 726. Based on and/or in response to retrieval of the training samples at block 726, discovery log database 700 may be configured to provide the training samples to discovery application 600, as indicated by arrow 728. The operations of arrow 724 through arrow 728 may be performed, for example, after discovery log database 700 accumulates at least a threshold number of samples for at least one ML model, thereby allowing the at least one ML model to be trained to reach at least a threshold level of accuracy in generating error values.

Based on and/or in response to reception of the training samples at arrow 728, discovery application 600 may be configured to train an ML model for the error type using the training samples, as indicated by block 730. The ML model may be trained using training samples obtained from a plurality of different managed networks (e.g., resulting in a network-agnostic ML model), training samples from a particular managed network (e.g., resulting in a network-specific ML model), training samples generated using a particular discovery pattern (e.g., resulting in a pattern-specific ML model), and/or training samples generated using a plurality of different discovery patterns (e.g., resulting in a pattern-agnostic ML model).

Client device 702 may be configured to request execution of the discovery pattern, as indicated by arrow 732. For example, the request at arrow 732 may be provided after training of the ML model is completed. Client device 702 may be configured to transmit the request at arrow 732 based on and/or in response to user input, a particular schedule, and/or discovery of a particular computing resource, among other possibilities.

Based on and/or in response to reception of the request at arrow 732, discovery application 600 may be configured to determine variable parameter value(s) associated with execution of the discovery pattern, as indicated by block 734. Discovery application 600 may be configured to determine variable parameter value(s) by parsing the discovery pattern, parsing log data (e.g., representing results of prior executions of the discovery pattern), and/or determining the values of variable(s) that form part of a context in which the discovery pattern is expected to execute, among other possibilities.

Alternatively or additionally, discovery application 600 may be configured to read from memory the discovery pattern and/or variable parameter value(s) associated with execution of the discovery pattern that were previously stored in the memory. This may allow ongoing and/or periodic evaluation of established discovery patterns with possibly differing sets of variable parameter value(s).

Based on and/or in response to determination of the variable parameter value(s) at block 734, discovery application 600 may be configured to determine, based on processing the variable parameter value(s) by the ML model, an error value for the discovery pattern, as indicated by block 736. Based on and/or in response to determination of the error value at block 736, discovery application 600 may be configured to determine that the error value exceeds a threshold error value for the discovery pattern, as indicated by block 738. Thus, the discovery application 600 may be configured to determine that the discovery pattern, if executed in connection with the variable parameter value(s), is sufficiently likely to fail that it is recommended that at least some of the variable parameter value(s) be modified prior to execution thereof.

Turning to FIG. 7C, based on and/or in response to the determination that the error value exceeds the threshold error value at block 738, discovery application 600 may be configured to block execution of the discovery pattern, as indicated by block 740. Blocking execution of the discovery pattern when it is determined that the discovery pattern is sufficiently likely to fail may allow discovery application 600 to avoid wasting computing resources and/or electrical power on operations that are unlikely to yield useful output.

Based on and/or in response to blocking execution of the discovery pattern at block 740, discovery application 600 may be configured to provide, to client device 702, the error value and suggested variable parameter(s) to be modified, as indicated by arrow 742. In some implementations, discovery application 600 may be configured to also provide, to client device 702, the threshold error value associated with the discovery pattern, among other information.

The suggested variable parameter(s) may include one or more variable parameters that are associated with the occurrence of the error type detected by the ML model. For example, the suggested variable parameter(s) may be based on and/or include suggested solution(s) 642-644 for error types 624-632. Thus, in some cases, the suggested variable parameter(s) may be identified empirically by discovery application 600 based on the log data. In other cases, the one or more corresponding variable parameters for each respective error type may be predetermined based on the error type.

Based on and/or in response to reception of the error value and the suggested variable parameter(s) at arrow 742, client device 702 may be configured to display the error value and the suggested variable parameter(s), as indicated by block 744. Thus, client device 702 may suggest to a user how to update the discovery pattern to avoid the error type or at least reduce the likelihood thereof.

Based on and/or in response to displaying the error value and the suggested variable parameter(s) at block 744, client device 702 may be configured to provide, to discovery application 600, updated value(s) of the suggested variable parameter(s), as indicated by arrow 746. In some cases, client device 702 may additionally or alternatively provide, to discovery application 600, updated value(s) of other variable parameter(s) that were not suggested at block 744. That is, the user of client device 702 may determine to address the potential error as suggested by discovery application 600 and/or as otherwise determined by the user.

Based on and/or in response to reception of the updated value(s) at arrow 746, discovery application 600 may be configured to determine an updated error value for the discovery pattern based on processing, by the ML model, the variable parameter value(s) as updated, as indicated by block 748. Based on and/or in response to determination of the updated error value at block 748, discovery application 600 may be configured to determine that the updated error value does not exceed the threshold error value, as indicated by block 750. Based on and/or in response to the determination at block 750, discovery application 600 may be configured to execute the discovery pattern using the variable parameter value(s) as updated, as indicated by block 752.

That is, discovery application 600 may be configured to determine whether the updated value(s) of the variable parameters are sufficiently likely to avoid the error to warrant an attempted execution of the discovery pattern. If the updated error value determined at block 748 exceeded the threshold error value, discovery application 600 may be configured to continue to block execution of the discovery pattern. Alternatively, discovery application 600 may be configured to permit execution of the discovery pattern as long as some of the suggested variable parameters were updated at arrow 746, regardless of whether the updated error value exceeds the threshold error value.

In some implementations, discovery application 600 may allow the blocking of execution of the discovery pattern to be overridden, thus allowing the discovery pattern to be executed irrespectively of the error value determined by the ML model. That is, discovery application 600 may suggest to the user how to avoid the error, but might not force the user to take any action to avoid the error. The extent of blocking performed by discovery application 600 may be a modifiable parameter of discovery application 600, thus allowing different managed networks to implement different blocking policies with respect to discovery operations executed on behalf of these different managed networks.

VIII. EXAMPLE OPERATIONS

Figure 8:
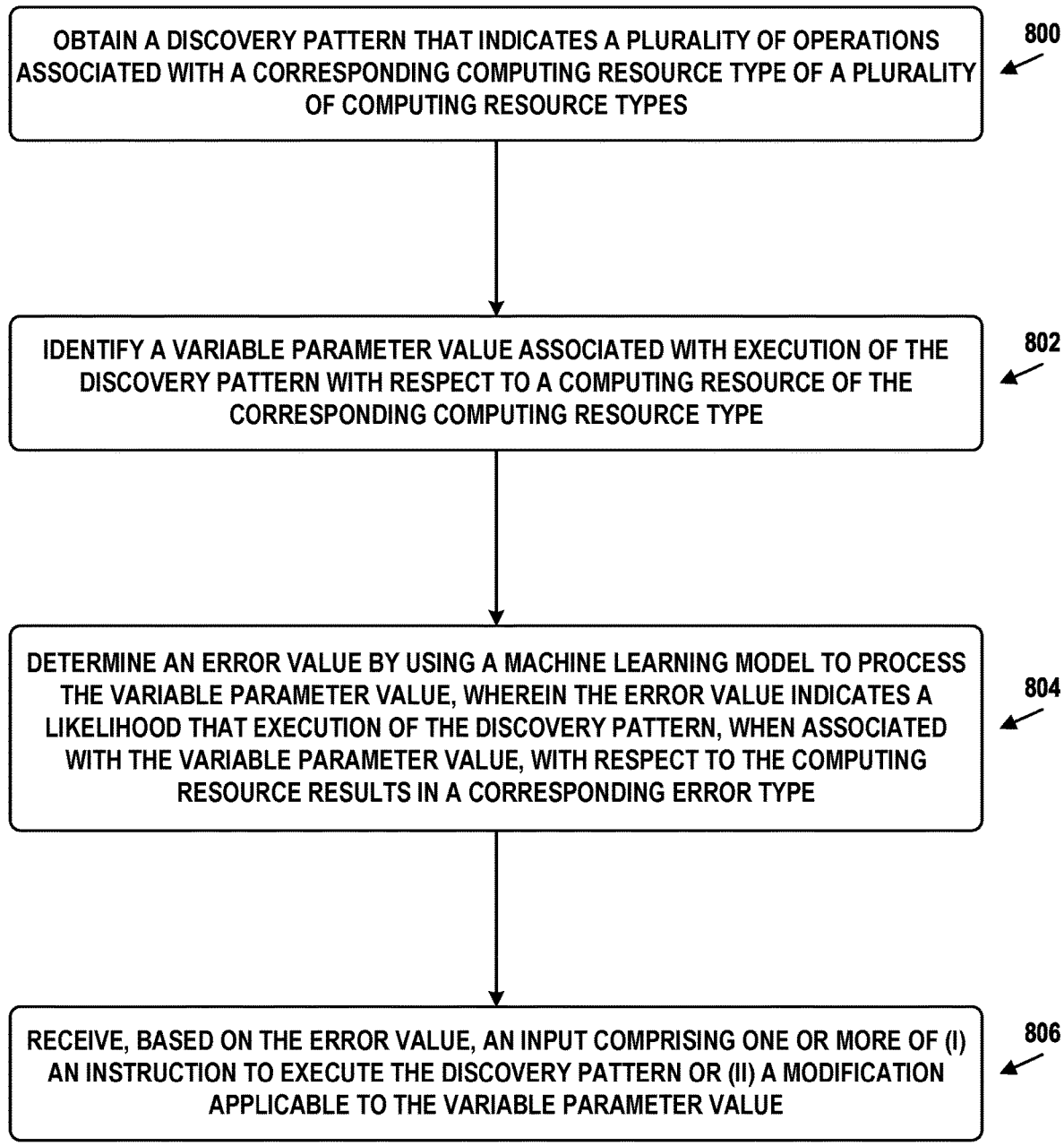
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining a discovery pattern that indicates a plurality of operations associated with a corresponding computing resource type of a plurality of computing resource types.

Block 802 may involve identifying a variable parameter value associated with execution of the discovery pattern with respect to a computing resource of the corresponding computing resource type.

Block 804 may involve determining an error value by using a machine learning model to process the variable parameter value. The error value may indicate a likelihood that execution of the discovery pattern, when associated with the variable parameter value, with respect to the computing resource results in a corresponding error type.

Block 806 may involve receiving, based on the error value, an input comprising one or more of (i) an instruction to execute the discovery pattern or (ii) a modification applicable to the variable parameter value.

In some examples, determining the error value may include determining a plurality of error values by processing the variable parameter value by the machine learning model. Each respective error value of the plurality of error values may be associated with a corresponding error type of a plurality of different error types and may indicate a likelihood that execution of the discovery pattern, when associated with the variable parameter value, with respect to the computing resource results in the corresponding error type.

In some examples, the variable parameter value may include a plurality of variable parameter values of a plurality of different variable parameters of the discovery pattern. Each respective error type of the plurality of different error types may be associated with a corresponding variable parameter of the plurality of different variable parameters. One or more variable parameter values of the corresponding variable parameter may be associated with occurrence of the respective error type. At least one error value that exceeds a threshold error value may be determined based on the plurality of error values. An indication may be displayed to modify, prior to execution of the discovery pattern, a variable parameter value of the variable parameter that is associated with the error type of the at least one error.

In some examples, the machine learning model may include a plurality of machine learning models. Each respective machine learning model of the plurality of machine learning models may be (i) associated with a corresponding error type of a plurality of different error types and (ii) configured to generate the respective error value for the corresponding error type.

In some examples, the plurality of different error types may include two or more of: (i) a bad request error indicating that a request made by the discovery pattern is invalid, (ii) a graceful termination error indicating that the computing resource does not exist, (iii) a throttling error indicating that a number of requests to a computing system containing the computing resource exceeds a threshold number of requests, (iv) a socket timeout error indicating that a flow of data from the computing system has been interrupted, or (v) a permissions error indicating that the discovery pattern is not permitted to access information about the computing resource.

In some examples, the machine learning model may have been trained based on log data representing outcomes of prior executions of the discovery pattern. The log data may include, for each respective prior execution of the prior executions, (i) a corresponding variable parameter training value and (ii) a ground-truth outcome of the respective prior execution associated with the corresponding variable parameter training value.

In some examples, the log data may include (i) internal log data generated by a managed network with which the computing resource is associated and (ii) external log data generated by one or more other managed networks. The machine learning model may have been pre-trained using the external log data and fine-tuned using the internal log data.

In some examples, receiving the input may include causing the error value to be displayed and receiving the input after causing the error value to be displayed.

In some examples, it may be determined that the error value exceeds a threshold error value. Based on determining that the error value exceeds the threshold error value, a prompt may be displayed indicating to modify the variable parameter value prior to executing the discovery pattern.

After displaying the prompt, the modification of the variable parameter value may be obtained.

In some examples, based on determining that the error value exceeds the threshold error value, execution of the discovery pattern may be blocked until the variable parameter value is modified.

In some examples, it may be determined that the error value does not exceed a threshold error value. Based on receiving the instruction to execute the discovery pattern and determining that the error value does not exceed the threshold error value, the discovery pattern may be executed.

In some examples, the variable parameter value may represent an input to the discovery pattern that is configured to allow the discovery pattern to execute with respect to the computing resource.

In some examples, the variable parameter value may represent an attribute of one or more prior executions of the discovery pattern with respect to one or more computing resources of the corresponding computing resource type.

In some examples, the variable parameter value may represent an attribute of a context in which the discovery pattern is planned to execute with respect to the particular computing resource.

In some examples, the plurality of operations of the discovery pattern may be configured to acquire information about the corresponding computing resource type.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
  obtaining a discovery pattern that indicates a plurality of operations configured to acquire information about a corresponding computing resource type of a plurality of computing resource types;
  identifying a variable parameter value that is associated with and affects execution of the discovery pattern with respect to a computing resource of the corresponding computing resource type;
  determining, prior to execution of the discovery pattern with respect to the computing resource, an error value by using a machine learning model to process the variable parameter value, wherein the error value indicates a likelihood that execution of the discovery pattern, when associated with the variable parameter value, with respect to the computing resource results in a corresponding error type, and wherein occurrence of an error of the corresponding error type during the execution of the discovery pattern prevents the discovery pattern from obtaining at least some of the information about the computing resource; and receiving, based on the error value, an input comprising one or more of (i) an instruction to execute the discovery pattern or (ii) a modification applicable to the variable parameter value.

2. The method of claim 1, wherein determining the error value comprises:

determining a plurality of error values by processing the variable parameter value by the machine learning model, wherein each respective error value of the plurality of error values is associated with a corresponding error type of a plurality of different error types and indicates a likelihood that execution of the discovery pattern, when associated with the variable parameter value, with respect to the computing resource results in the corresponding error type.

3. The method of claim 2, wherein the variable parameter value comprises a plurality of variable parameter values of a plurality of different variable parameters of the discovery pattern, wherein each respective error type of the plurality of different error types is associated with a corresponding variable parameter of the plurality of different variable parameters, wherein one or more variable parameter values of the corresponding variable parameter are associated with occurrence of the respective error type, and wherein the method further comprises:

determining, based on the plurality of error values, at least one error value that exceeds a threshold error value; and displaying an indication to modify, prior to execution of the discovery pattern, a variable parameter value of the variable parameter that is associated with the error type of the at least one error value.

4. The method of claim 2, wherein the machine learning model comprises a plurality of machine learning models, wherein each respective machine learning model of the plurality of machine learning models is (i) associated with a corresponding error type of a plurality of different error types and (ii) configured to generate the respective error value for the corresponding error type.

5. The method of claim 2, wherein the plurality of different error types comprises two or more of: (i) a bad request error indicating that a request made by the discovery pattern is invalid, (ii) a graceful termination error indicating that the computing resource does not exist, (iii) a throttling error indicating that a number of requests to a computing system containing the computing resource exceeds a threshold number of requests, (iv) a socket timeout error indicating that a flow of data from the computing system has been interrupted, or (v) a permissions error indicating that the discovery pattern is not permitted to access information about the computing resource.

6. The method of claim 1, wherein the machine learning model has been trained based on log data representing outcomes of prior executions of the discovery pattern, wherein the log data comprises, for each respective prior execution of the prior executions, (i) a corresponding variable parameter training value and (ii) a ground-truth outcome of the respective prior execution associated with the corresponding variable parameter training value.

7. The method of claim 6, wherein the log data comprises (i) internal log data generated by a managed network with which the computing resource is associated and (ii) external log data generated by one or more other managed networks, and wherein the machine learning model has been pre-trained using the external log data and fine-tuned using the internal log data.

8. The method of claim 1, wherein receiving the input comprises:

causing the error value to be displayed; and receiving the input after causing the error value to be displayed.

9. The method of claim 1, further comprising:

determining that the error value exceeds a threshold error value;

based on determining that the error value exceeds the threshold error value, displaying a prompt indicating to modify the variable parameter value prior to executing the discovery pattern; and after displaying the prompt, obtaining the modification applicable to the variable parameter value.

10. The method of claim 9, further comprising:

based on determining that the error value exceeds the threshold error value, blocking execution of the discovery pattern until the variable parameter value is modified.

11. The method of claim 1, further comprising:

determining that the error value does not exceed a threshold error value; and based on receiving the instruction to execute the discovery pattern and determining that the error value does not exceed the threshold error value, executing the discovery pattern.

12. The method of claim 1, wherein the variable parameter value represents an input to the discovery pattern configured to allow the discovery pattern to execute with respect to the computing resource.

13. The method of claim 1, wherein the variable parameter value represents an attribute of one or more prior executions of the discovery pattern with respect to one or more computing resources of the corresponding computing resource type.

14. The method of claim 1, wherein the variable parameter value represents an attribute of a context in which the discovery pattern is planned to execute with respect to the computing resource.

15. A non-transitory computer-readable medium, having stored thereon program instructions that, upon execution by a computing system, cause the computing system to perform operations comprising:

obtaining a discovery pattern that indicates a plurality of operations configured to acquire information about a corresponding computing resource type of a plurality of computing resource types;

identifying a variable parameter value that is associated with and affects execution of the discovery pattern with respect to a computing resource of the corresponding computing resource type;

determining, prior to execution of the discovery pattern with respect to the computing resource, an error value by using a machine learning model to process the variable parameter value, wherein the error value indicates a likelihood that execution of the discovery pattern, when associated with the variable parameter value, with respect to the computing resource results in a corresponding error type, and wherein occurrence of an error of the corresponding error type during the execution of the discovery pattern prevents the discovery pattern from obtaining at least some of the information about the computing resource; and receiving, based on the error value, an input comprising one or more of (i) an instruction to execute the discovery pattern or (ii) a modification applicable to the variable parameter value.

16. The non-transitory computer-readable medium of claim 15, wherein determining the error value comprises:
   determining a plurality of error values by processing the variable parameter value by the machine learning model, wherein each respective error value of the plurality of error values is associated with a corresponding error type of a plurality of different error types and indicates a likelihood that execution of the discovery pattern, when associated with the variable parameter value, with respect to the computing resource results in the corresponding error type.

17. The non-transitory computer-readable medium of claim 15, wherein the operations further comprise:
   determining that the error value exceeds a threshold error value;
   based on determining that the error value exceeds the threshold error value, displaying a prompt indicating to modify the variable parameter value prior to executing the discovery pattern; and
   after displaying the prompt, obtaining the modification applicable to the variable parameter value.

18. A system comprising:
   one or more processors; and
   memory, containing program instructions that, upon execution by the one or more processors, cause the system to perform operations comprising:
      obtaining a discovery pattern that indicates a plurality of operations configured to acquire information about a corresponding computing resource type of a plurality of computing resource types;
      identifying a variable parameter value that is associated with and affects execution of the discovery pattern with respect to a computing resource of the corresponding computing resource type;
      determining, prior to execution of the discovery pattern with respect to the computing resource, an error value by using a machine learning model to process the variable parameter value, wherein the error value indicates a likelihood that execution of the discovery pattern, when associated with the variable parameter value, with respect to the computing resource results in a corresponding error type, and wherein occurrence of an error of the corresponding error type during the execution of the discovery pattern prevents the discovery pattern from obtaining at least some of the information about the computing resource; and
      receiving, based on the error value, an input comprising one or more of (i) an instruction to execute the discovery pattern or (ii) a modification applicable to the variable parameter value.

19. The method of claim 1, wherein the input comprises the modification applicable to the variable parameter value, and wherein the method further comprises:
   determining, prior to execution of the discovery pattern with respect to the computing resource, an updated error value by using the machine learning model to process the variable parameter value as modified by the modification applicable thereto, wherein the updated error value indicates a likelihood that execution of the discovery pattern, when associated with the variable parameter value as modified, with respect to the computing resource results in the error of the corresponding error type; and
   receiving, based on the updated error value, a second input comprising a second instruction to execute the discovery pattern using the variable parameter value as modified.

20. The method of claim 1, wherein the discovery pattern is one of a plurality of different discovery patterns for the plurality of computing resource types, wherein the machine learning model comprises a plurality of pattern-specific machine learning models, wherein each respective pattern-specific machine learning model of the plurality of pattern-specific machine earning models (i) is configured to determine error values for a corresponding discovery pattern of the plurality of different discovery patterns and (ii) has been trained using training samples generated using the corresponding discovery pattern.

* * * * *